(12) United States Patent
Stempel et al.

(10) Patent No.: US 7,421,568 B2
(45) Date of Patent: Sep. 2, 2008

(54) POWER SAVING METHODS AND APPARATUS TO SELECTIVELY ENABLE CACHE BITS BASED ON KNOWN PROCESSOR STATE

(75) Inventors: Brian Michael Stempel, Raleigh, NC (US); James Norris Dieffenderfer, Apex, NC (US); Jeffrey Todd Bridges, Raleigh, NC (US); Rodney Wayne Smith, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 11/073,284

(22) Filed: Mar. 4, 2005

(65) Prior Publication Data

US 2006/0200686 A1    Sep. 7, 2006

(51) Int. Cl.
*G06F 9/30* (2006.01)
(52) U.S. Cl. ..................................... 712/220
(58) Field of Classification Search .................. 712/220
See application file for complete search history.

(56) References Cited

U.S. PATENT DOCUMENTS

| | | | |
|---|---|---|---|
| 5,115,500 A * | 5/1992 | Larsen | 712/209 |
| 5,499,204 A * | 3/1996 | Barrera et al. | 365/49 |
| 5,644,744 A | 7/1997 | Mahin et al. | |
| 6,141,745 A | 10/2000 | Pickett | |
| 6,253,309 B1 * | 6/2001 | Mahalingaiah | 712/213 |
| 6,275,927 B2 * | 8/2001 | Roberts | 712/213 |
| 2004/0107330 A1 | 6/2004 | Brown | |

\* cited by examiner

*Primary Examiner*—Eddie P Chan
*Assistant Examiner*—Robert E Fennema
(74) *Attorney, Agent, or Firm*—Nicholas J. Pauley; Joseph B. Agusta; Thomas Rouse (57) ABSTRACT

A processor capable of fetching and executing variable length instructions is described having instructions of at least two lengths. The processor operates in multiple modes. One of the modes restricts instructions that can be fetched and executed to the longer length instructions. An instruction cache is used for storing variable length instructions and their associated predecode bit fields in an instruction cache line and storing the instruction address and processor operating mode state information at the time of the fetch in a tag line. The processor operating mode state information indicates the program specified mode of operation of the processor. The processor fetches instructions from the instruction cache for execution. As a result of an instruction fetch operation, the instruction cache may selectively enable the writing of predecode bit fields in the instruction cache and may selectively enable the reading of predecode bit fields stored in the instruction cache based on the processor state at the time of the fetch.

18 Claims, 8 Drawing Sheets

POWER SAVING METHODS AND APPARATUS TO SELECTIVELY ENABLE CACHE BITS BASED ON KNOWN PROCESSOR STATE

BACKGROUND OF THE INVENTION

1. Field of the Invention

The present invention relates generally to techniques to reduce power in a processor which processes instructions having a variety of lengths, and, more particularly, to advantageous techniques for selectively enabling and disabling writing and reading predecode bits in an instruction cache.

2. Relevant Background

Many processors typically support instruction sets having variable length instructions. For example, a processor's instruction set may consist of 32-bit instructions and 16-bit instructions. A processor may also have a hierarchical memory configuration with multi-levels of caches including an instruction cache, a data cache, and system memory. If the processor also has a deep execution pipeline that operates at a high clock rate with short duration pipeline stages, it is also likely that the processor has a predecode stage to preprocess the instructions in order to simplify a subsequent decode stage and, thus, streamline the pipeline. The predecode pipeline stage is commonly operative during an instruction cache miss to partially decode instructions that are fetched due to the instruction miss. The predecode information is written into the instruction cache along with the fetched instructions.

In a variable length instruction processor, the instructions fetched due to a miss may be of varying length. The predecode operation determines a set of predecode bits for each instruction and the instruction and predecode bits are stored in the instruction cache independent of the processor's operating state. The writing and reading of predecode bits which may be unnecessary due to the processor's operating state is a source of power loss.

SUMMARY OF THE DISCLOSURE

Among its several aspects, the present invention recognizes that power can be conserved by selectively enabling the writing and reading of predecode bits. A first embodiment of the invention recognizes that a need exists for a technique which fetches and executes variable length instructions of a first length and of a second length, the second length being longer than the first length. A processor operating mode state indicator indicates the processor is in a mode of operation that restricts instructions to instructions of the second length. A predecoder partially decodes instructions of the first length and the second length and generates predecode bits for each partially decoded instruction. Instructions and predecode bits are stored in a cache line in an instruction cache. Write control logic selectively writes predecode bits in a cache line dependent upon the processor operating mode state indicator whereby less than all the predecode bits are written for instructions of the second length. A tag associated with the cache line is written with an instruction address and a processor state bit. When reading, a fetch instruction address and a processor operating mode indicator are compared with the tag and if the comparison is equal selected predecode bits are read from the cache line whereby less than all the predecode bits available in the cache line are read for instructions of the second length.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be written in a high level programming language such as C, C++, JAVA®, Smalltalk, JavaScript®, Visual Basic®, TSQL, Perl, or in various other programming languages. Programs for the target processor architecture may also be written directly in the native assembler language. A native assembler program uses instruction mnemonic representations of machine level binary instructions. Program code or computer readable medium as used herein refers to machine language code such as object code whose format is understandable by a processor.

Figure 1:
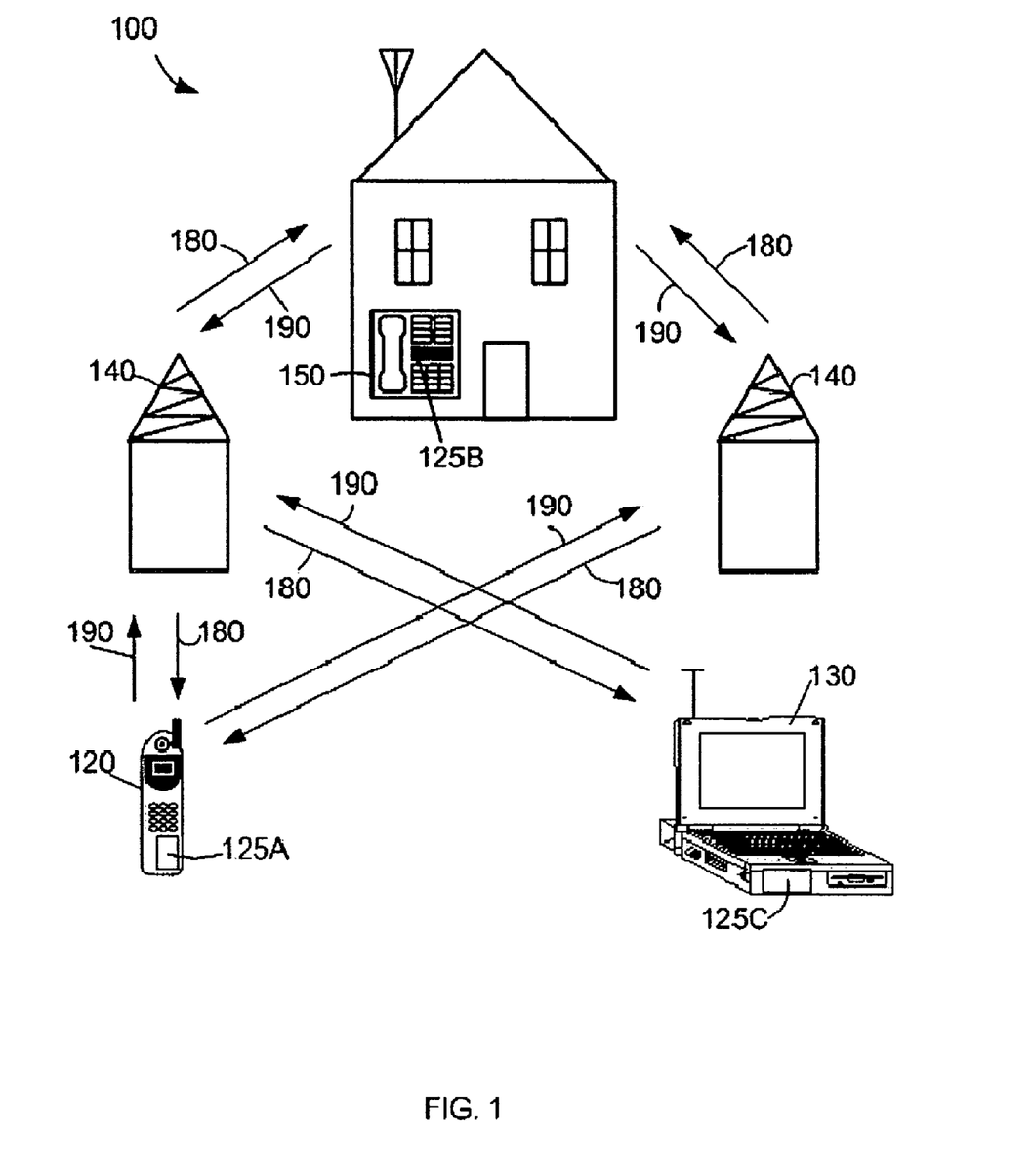
FIG. 1 is a graphic illustration of an exemplary wireless communication system in which an embodiment of the invention may be advantageously employed.

FIG. 1 is an illustration of an exemplary wireless communication system 100 in which an embodiment of the invention may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include hardware components 125A, 125B, and 125C, respectively, executing program code in accordance with the present invention. FIG. 1 shows a forward link signal 180 from the base stations 140 and the remote units 120, 130, and 150 and a reverse link signal 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may be hand-held personal communication systems (PCS) units, portable data units such as personal data assistants, or fixed location data units such as meter reading equipment. Although FIG. 1 illustrates remote units according to the teachings of the invention, the invention is not limited to these exemplary illustrated units. The invention may be suitably employed in any hardware component using a pipelined processor having variable length instructions which stores predecode information in an instruction cache.

Figure 2:
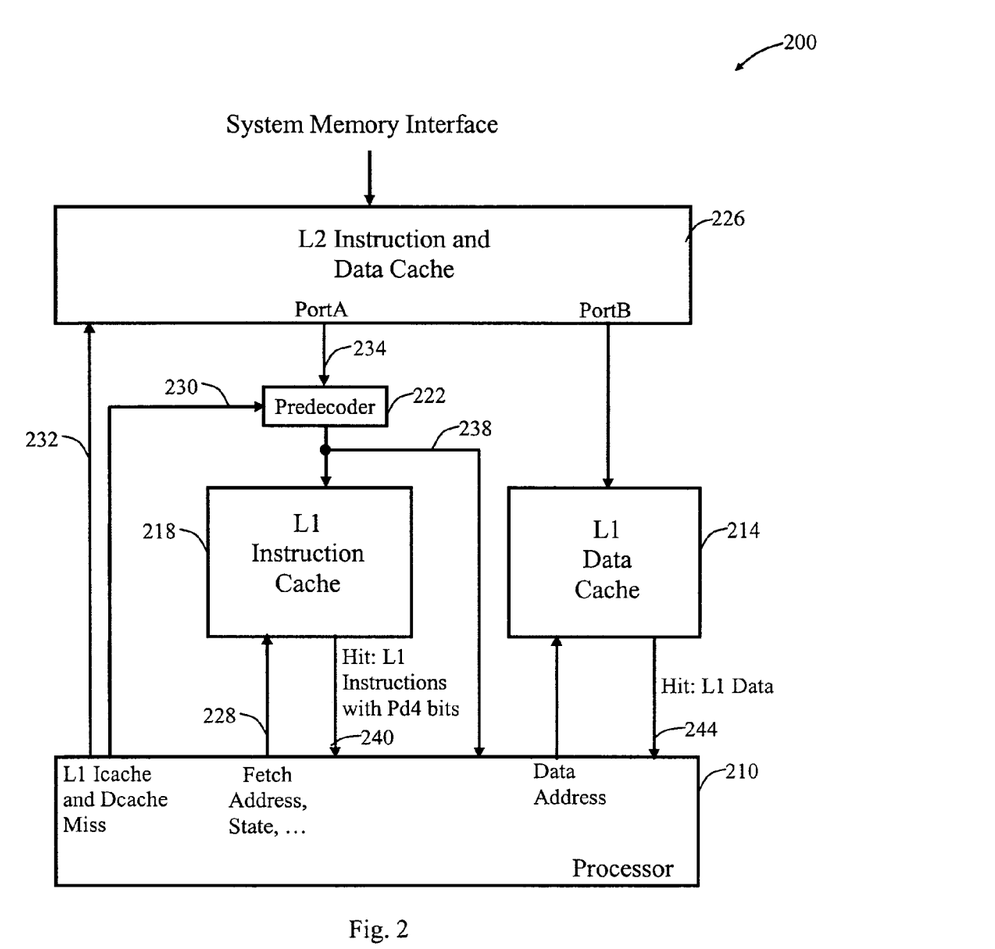
FIG. 2 is a graphic illustration of a processor complex in accordance with the present invention.

FIG. 2 is an illustration of a processor complex 200 in which an embodiment of the invention may be advantageously employed. The processor complex 200 may be suitably employed in hardware components 125A-C for executing program code. The processor complex 200 includes a processor 210 which executes instructions of different lengths, a level 1 (L1) data cache 214, an L1 instruction cache (Icache) 218, a predecoder 222, a level 2 instruction and data cache (L2 cache) 226, and an interface to system memory. Peripheral devices which may connect to the processor complex are not shown for clarity of discussion of the present invention. The processor 210 is directly coupled to the L1 data cache 214, L1 Icache 218, and the predecoder 222. The processor 210 retrieves instructions and data from the caches in a hierarchical fashion. For example, the processor 210 fetches an instruction by generating a fetch address and processor operating mode state on L1 Icache inputs 228, and providing other information as may be required to fetch an instruction, such as a process identification (PID) signal. The processor operating mode state is an indicator of the programmer specified mode of operation of the processor.

The processor's instruction set includes instructions encoded in multiple length formats, where longer instructions are commonly a multiple of the shortest instruction format length available in the variable length instruction set. Since an instruction may have a complex encoding that may vary depending upon the length of the instruction and may be adjacent to instructions of different lengths, the alignment and decoding of a fetched instruction may require processing beyond what is capable in a single processor pipeline stage with a short duration clock period. Due to the level of instruction complexity, the processor may include a separate instruction alignment pipeline stage and split the decode operation into a predecode step and a decode pipeline stage. The predecode step may be suitably hidden from normal pipeline execution by doing the predecode operation during L1 Icache miss processing. L1 Icache miss processing occurs when the fetched instruction is not found in the L1 Icache and must be fetched from higher levels of the memory hierarchy. The predecode step stores predecode information along with the fetched instruction in the L1 instruction cache.

In operation, the processor 210 accesses the L1 Icache 218 to determine if the addressed instruction is present in the L1 Icache by use of a match mechanism. If no match is found for the fetched instruction in the L1 Icache 218, a miss occurs. Miss information 230 is sent to the predecoder 222, and the processor 210 makes an access request 232 to the L2 cache 226. With an instruction hit in the L2 cache 226, an L2 cache line containing the desired instruction is output on portA 234 to the predecoder 222. The predecoder 222, during a predecode stage in the miss processing, partially decodes the instructions fetched from the L2 cache and provides instructions, predecoded bits associated with the instructions, and tag information on output 238 to the L1 Icache 218 and to the processor 210.

When the processor 210 needs to fetch data, the processor 210 accesses L1 data cache 214 to determine if the addressed data is present in the L1 data cache by use of a match mechanism. If no match is found for the fetched data in the L1 data cache 214, a miss occurs and the L2 cache 226 is accessed next. In both L1 cache cases, if the instruction or data is found to be present in the L1 instruction or L1 data cache, respectively, then the instruction and data are read directly from their respective L1 cache on outputs 240 and 244.

Figure 3A:
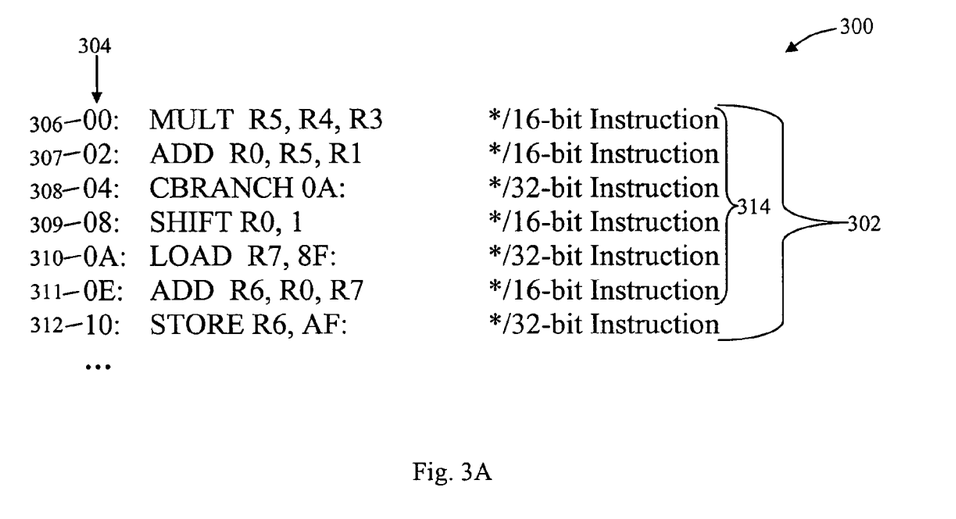
FIG. 3A is a graphic illustration of an exemplary program segment containing varying length instructions of 16 and 32 bits in accordance with the present invention.

FIG. 3A is an exemplary program segment 300 that may be suitably stored in the memory hierarchy of the processor complex 200, including the L2 cache 226 and the L1 Icache 218. It should be noted that although for illustration purposes the program segment is assumed to be retrieved from a cache line, the teachings of the invention are appliable to any memory device storing the program segment. In general, the term cache line may also be referred to as an instruction string or an instruction stream. Since a cache line may have a fixed length, the terms instruction string or instruction stream typically refer to one or more program segments which may or may not span the boundary of a cache line.

The program segment 300 includes instructions 302 which come from a variable length instruction set consisting of 16-bit and 32-bit instructions. For example, consider processor 210 to use 16-bit and 32-bit instruction formats for multiple types of instructions and supports several modes of operation that specify and restrict instruction type usage. Processor 210 has a first mode of operation that specifies only 32-bit instructions may be used and a second mode of operation that specifies that a combination of 16-bit and 32-bit instructions may be used. While processors typically have multiple modes of operation, for the purposes of clarity of discussion of the present invention, the description of the exemplary processor 210 is primarily limited to the first and second modes of operation described above.

In order to illustrate aspects of the present invention, several exemplary 16-bit and 32-bit instructions are illustrated in FIG. 3A. For purposes of illustration, program relative byte indicators 304 represent the byte location in a cache line where an instruction begins and indirectly indicate the size of the instruction. For example, the MULT R5, R4, R3 instruction 306 begins at byte position 00 and ends at byte position 01. Thus, MULT R5, R4, R3 instruction 306 is a 16-bit instruction. Similarly, the ADD instructions 307 and 311 and the SHIFT instruction 309 are 16 bits long. The conditional branch (CBRANCH) instruction 308, the load (LOAD) instruction 310, and the store (STORE) instruction 312 are 32-bits long.

Figure 3B:
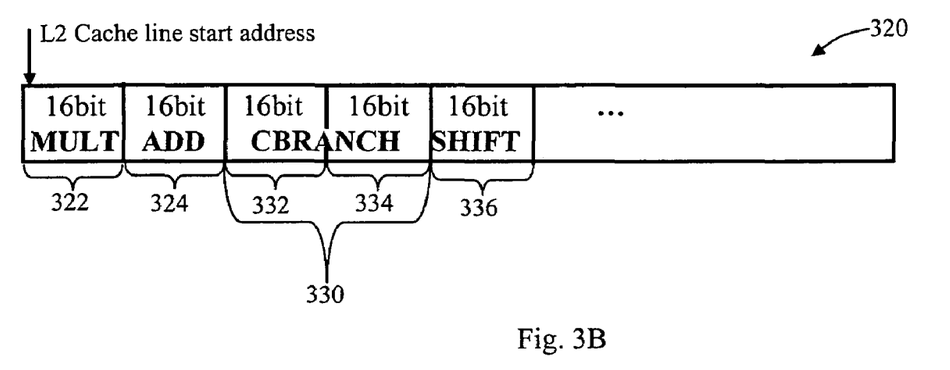
FIG. 3B is a graphic illustration of an instruction line from a level 2 instruction and data cache (L2 cache) containing instructions from the program segment of FIG. 3A in accordance with the present invention.

A portion of an L2 cache line 320 is depicted in FIG. 3B. Only a portion of a cache line is shown for illustrative purposes, as cache line sizes may vary depending upon the application, technology, and chosen memory hierarchy design. For example, a 256-bit or a 512-bit cache line may be used for an L2 cache. The illustrated portion has multiple 16-bit fields. Instructions 314 of FIG. 3A are stored in the L2 cache line 320 as indicated, with the MULT R5, R4, R3 instruction 306 stored in L2 cache line segment 322 starting at location 00. The ADD R0, R5, R1 instruction 307 is stored in L2 cache line segment 324 starting at location 02. The CBRANCH 0A instruction 308 is stored in L2 cache line segment 330. Instruction 308 is made up of two 16-bit segments 332 and 334, starting at location 04 and location 06, respectively. The SHIFT R0, 1 instruction 309 is stored in L2 cache line segment 336 starting at location 08. It is noted that for illustrative purposes, the program segment 300 has been shown starting at the beginning of a cache line, but it will be appreciated that such program segments may be located in other sections of a cache line and may be split between multiple cache lines.

Figure 3C:
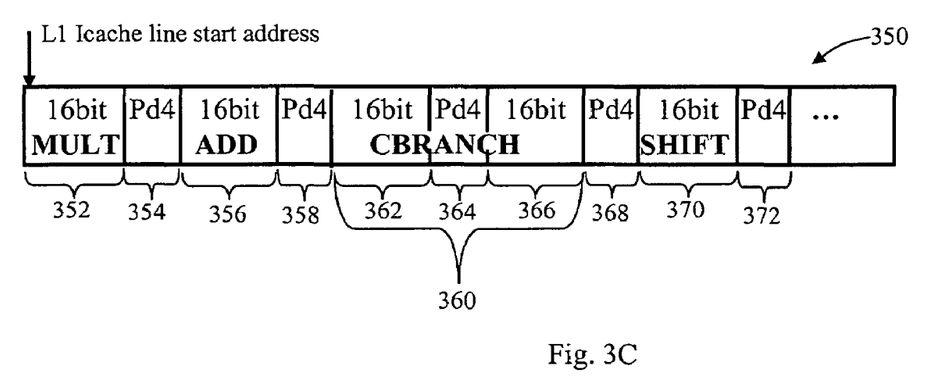
FIG. 3C is a graphic illustration of an instruction line from a level 1 instruction cache (L1 Icache) containing instructions from the program segment of FIG. 3A in accordance with the present invention.

An exemplary L1 Icache line 350 is depicted in FIG. 3C consisting of multiple 20-bit fields, with each 20-bit field made up of a 16-bit field with an associated 4-bit predecode (Pd4) field. For example, the L1 cache may utilize 128-bits for instructions and require an additional space for eight Pd4 fields resulting in a 160-bit L1 cache line. A single 4-bit Pd4 field is used for both 16-bit instructions and for 32-bit instructions. The 4-bit Pd4 field may contain up to sixteen encoded characteristics of the instruction associated with the Pd4 field. For example, the encoding may indicate whether the instruction is a load or store instruction, an arithmetic instruction, or a complex instruction requiring microcode support. The encoding may also indicate whether the 16 bits of instruction data is the first-half of a 32-bit instruction or a 16-bit instruction, whether the instruction is a branch type of instruction, or the like. The Pd4 information is useful in instruction alignment, decoding, and may be used for other purposes, such as branch handling, for example.

The instructions 314 of FIG. 3A may be located in the L1 cache line beginning with the 16-bit MULT R5, R4, R3 instruction 306 and its associated Pd4 field stored in L1 cache line segments 352 and 354, respectively. Similarly, the 16-bit ADD R0, R5, R1 instruction 307 and its associated Pd4 field are stored in L1 cache line segments 356 and 358, respectively. The 32-bit CBRANCH 0A instruction 308 is stored differently since only one set of predecode bits is required to be stored with the 32-bit instruction. For illustrative purposes, the 16-bit L1 cache line segment 362 contains the high order 16-bits of the CBRANCH 0A instruction 308. The Pd4 field 364 provides predecode information for the 32-bit CBRANCH instruction while the next 16-bit L1 cache line segment 366 contains the low order 16-bits of the CBRANCH 0A instruction 308. The Pd4 field 368 is not required for the CBRANCH 0A instruction 308. Since other program segments may occupy the cache line at different times, the Pd4 field 368 may be used in support of a 16-bit instruction that is stored, for example, in the 16-bit L1 cache line segment 366. The next instruction in the L1 cache line is a 16-bit SHIFT R0, 1 instruction 309 which is stored in a 20-bit field made up of 16-bit L1 cache line segment 370 and Pd4 field 372. A similar ordering for the other instructions in program segment 314 is followed for the remaining bit fields in the cache line 350.

Figure 4A:
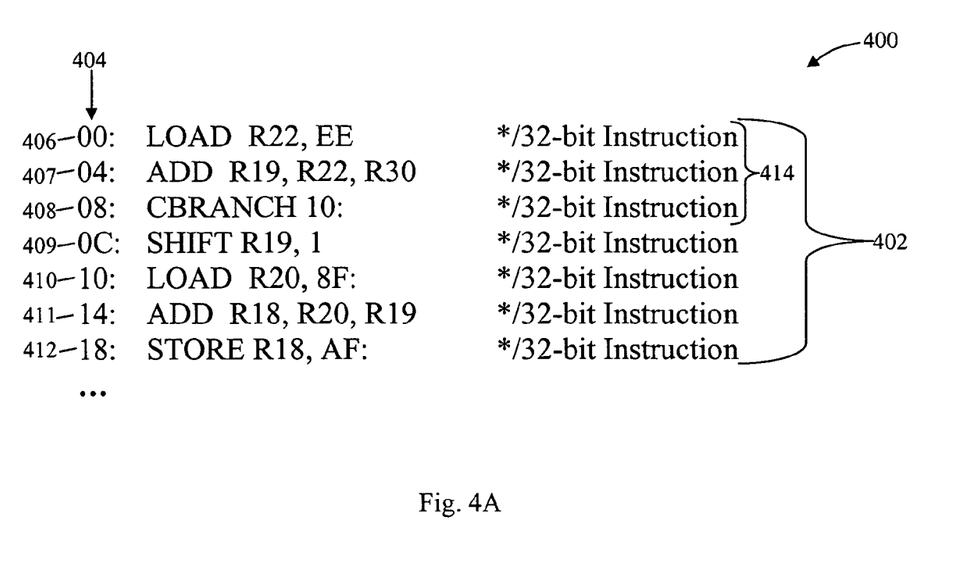
FIG. 4A is a graphic illustration of an exemplary program segment containing only 32-bit instructions operative in a processor mode restricted to only 32-bit instructions in accordance with the present invention.

FIG. 4A illustrates an exemplary program segment 400 that may be suitably stored in the memory hierarchy of the processor complex 200, including the L2 cache 226 and the L1 Icache 218. The program segment 400 includes 32-bit instructions 402 operative in the first mode of operation of the processor 210 and all instructions are located by architectural definition on word aligned boundaries. In order to illustrate aspects of the present invention, several exemplary 32-bit instructions are illustrated in FIG. 4A. Program relative byte indicators 404 represent the byte location in the cache line where an instruction begins and indirectly indicate the size of the instruction. For example, the LOAD R22, EE instruction 406 begins at byte position 00 and ends at byte position 03. Thus, LOAD R22, EE instruction 406 is a 32-bit instruction. Similarly, the ADD instructions 407 and 411, the CBRANCH 10 408, the SHIFT instruction 409, the LOAD R20, 8F instruction 410, and the STORE instruction 412 are all 32-bits long.

Figure 4B:
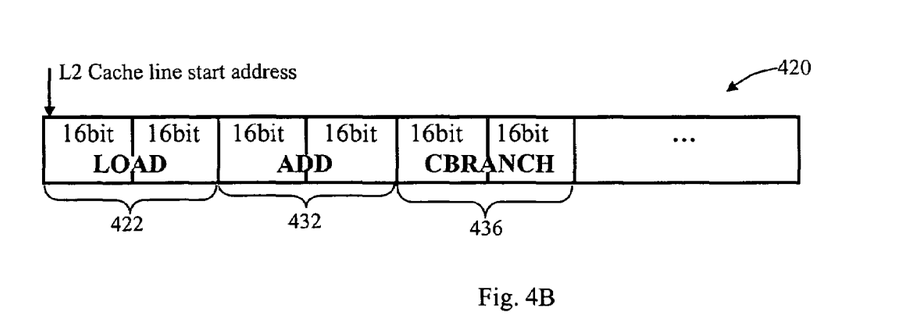
FIG. 4B is a graphic illustration of an instruction line from an L2 cache containing instructions from the program segment of FIG. 4A in accordance with the present invention.

A portion of an L2 instruction cache line 420 is depicted in FIG. 4B. Line 420 has multiple 16-bit fields. Only a portion of a cache line is illustrated as cache line sizes may vary depending upon the application, technology, and chosen memory hierarchy design. For example, either a 256-bit or a 512-bit cache line may be suitably used for an L2 cache. Instructions 414 of FIG. 4A are stored in the L2 cache line 420 as indicated, with the LOAD R22, EE instruction 406 stored in L2 cache line segment 422 starting at location 00. The ADD R19, R22, R30 instruction 407 is stored in L2 cache line segment 432 starting at location 04. The CBRANCH 10 instruction 408 is stored in L2 cache line segment 436 starting at location 08. The other 32-bit instructions are stored in a similar manner in the L2 cache. It is noted that for illustrative purposes, the program segment 400 has been shown starting at the beginning of a cache line, but it will be appreciated that such 32-bit instruction program segments may be located in other sections of a cache line on word boundaries and may be split between multiple cache lines.

Figure 4C:
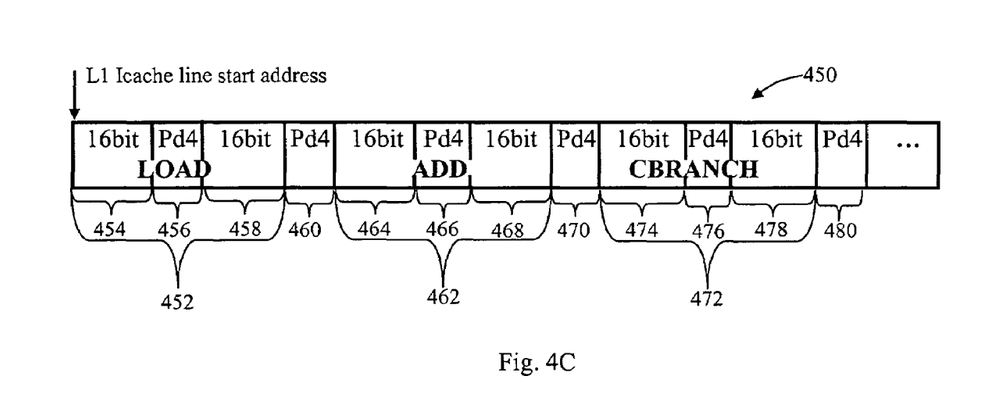
FIG. 4C is a graphic illustration of an instruction line from an L1 Icache containing instructions from the program segment of FIG. 4A in accordance with the present invention.

An exemplary L1 Icache line 450 is depicted in FIG. 4C. Line 450 has multiple 20-bit fields, with each 20-bit field made up of a 16-bit field with an associated 4-bit predecode (Pd4) field. A single 4-bit Pd4 field is used for both 16-bit instructions and for 32-bit instructions. For example, the L1 cache may store 128-bits for instructions and require an additional space for eight Pd4 fields resulting in a 160-bit L1 cache line. The instructions 414 of FIG. 4A may be located in the L1 cache line beginning with the 32-bit LOAD R22, EE instruction 406 stored in L1 cache line segment 452 made up of 16-bit segment 454, its associated Pd4 field 456, and 16-bit segment 458. Since the 4-bit Pd4 field 456 supplies the predecode information for the 32-bit LOAD R22, EE instruction, the second 4-bit Pd4 field 460 is not needed and consequently, by use of the techniques of the present invention, the Pd4 field 460 is not written to or read from. Similarly, the 32-bit ADD R19, R22, R30 instruction 407 is stored in L1 cache line segments 464 and 468 and instruction 407's associated Pd4 field is stored in segment 466. Similarly, the 4-bit Pd4 field 470 is not needed, and using the techniques of the present invention, the Pd4 field 470 is not written to or read from. The 32-bit CBRANCH 10 instruction 408 is stored in L1 cache line segments 474 and 478 and the CBRANCH 10 instruction 408's associated Pd4 field is stored in segment 476. The Pd4 field 480 is also not needed. Again, using of the techniques of the present invention, the Pd4 field 480 is not written to or read from. Since other program segments may occupy the cache line at different times, the Pd4 fields 460, 470, and 480 may be used in support of 16-bit instructions, for example, associated with the 16-bit L1 cache line segments 458, 468, and 478, respectively. A similar ordering for the next 32-bit instruction 409 in program segment 414 is followed for the remaining bit fields in the cache line 450.

One aspect of the present invention relates to the writing of the predecode information into an L1 cache line according to the techniques of the present invention to save power when writing to the L1 Icache. A second aspect addresses the selective enabling of predecode bit fields to save power when reading from the L1 Icache. Both of these aspects are described in further detail below.

Figure 5:
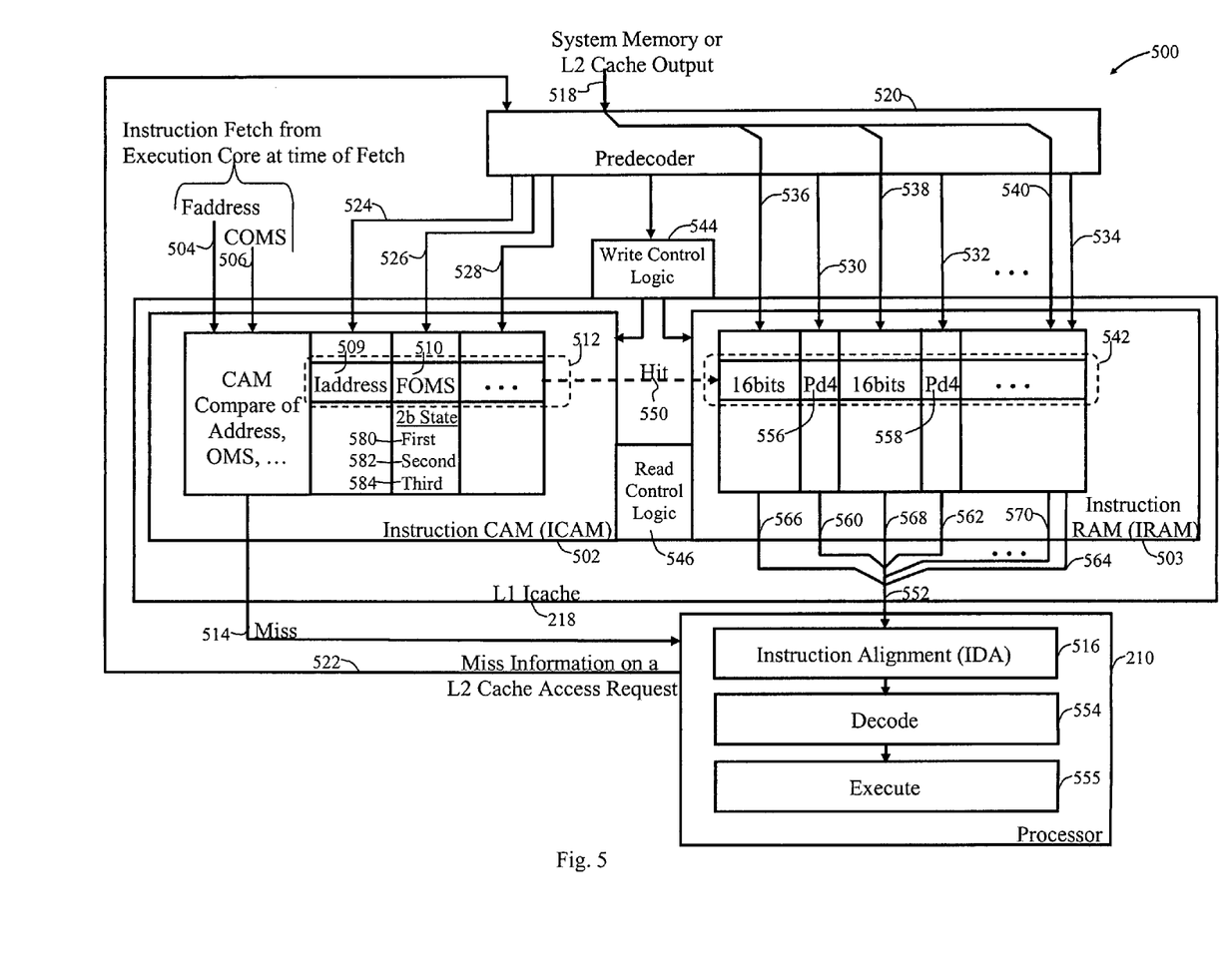
FIG. 5 is a graphic illustration of processor pipeline stages which operate in accordance with the present invention to save power when writing to the L1 Icache and reading from the L1 Icache.

FIG. 5 illustrates processor pipeline stages 500 which operate in accordance with the present invention to save power when writing to the L1 Icache 218 and when reading from the L1 Icache 218. The L1 Icache 218 is split into two processor pipeline stages. A first pipeline stage is used for instruction tag matching in an instruction content addressable memory (ICAM) unit 502. A second pipeline stage is used for accessing instructions from an instruction random access memory (IRAM) 503 when a tag match hit occurs in the ICAM unit 502. After the Icache 218, instructions enter the processor 210 in an instruction alignment (IDA) stage 516, followed by a decode stage 554, and then execute stages 555.

The present invention operates to save power when writing to the L1 Icache. For example, when an L1 Icache miss occurs, instructions from the L2 cache or system memory and selected predecode bit fields are written to the L1 Icache. Depending upon processor state information, the selected predecode bit fields that are written to the L1 Icache may be less than all the predecode bit fields available in an Icache line, thereby saving power. The saving of power is accomplished when resolving an L1 Icache miss which may occur for many reasons. For example, on initialization of the L1 Icache, the cache is treated as having invalid contents and there will be misses as the L1 Icache is filling. Also, when a program branches to a new section of code, there is a greater chance for an cache miss occurring on an L1 Icache fetch.

The processor 210 initiates the fetching of instructions from the L1 Icache by providing the address of the instruction to be fetched (Faddress) 504, and by providing current operating mode state (COMS) information 506 which is representative of the program specified operating mode at the time of the fetch to the ICAM unit 502. Processor 210 may also provide other information, such as the PID, to the ICAM unit 502. The COMS information at the time of the fetch may include whether the processor is in the first mode of operation which uses only 32-bit instructions on word aligned boundaries, the second mode of operation which uses both 16-bit and 32-bit instructions, or other processor modes.

The ICAM unit 502 stores an instruction address (Iaddress) 509, the processor's operating mode at the time of fetch (FOMS) 510, and other such information deemed necessary for a match operation, as tags in ICAM lines, such as ICAM line 512. In an instruction fetch operation, the processor supplies an Faddress 504 and processor COMS 506 which are compared to the stored ICAM line tags to determine if any stored ICAM lines hold valid data that matches the processor supplied Faddress, and COMS. If no ICAM line is found with a valid matching address, processor operating mode state, or the like, it is considered a miss, and a miss indication 514 is given to the processor 210. The processor 210 proceeds to do a fetch from the L2 cache 226 or from system memory if the instruction is not found in the L2 cache 226. After a latency due to memory access timing, instructions are provided from the system memory or L2 cache output 518 to a predecoder 520 and IRAM 503. The processor 210 also sends predecoder 520 miss information 522 concerning the instruction fetch addressing, processor operating mode state at the time of the fetch, and the like.

The predecoder 520 tracks the miss information to account for memory latencies and makes miss information available. Miss information includes, for example, the processor L1 Icache fetch address and processor state at the time of the fetch. The tracked fetch address is supplied on output 524, the tracked processor state is supplied on output 526, and other information may be supplied on output 528, such as the PID, when the instructions are provided from the system memory or L2 cache output bus 518. The instructions on output bus 518 are partially decoded in predecoder 520 generating 4-bit Pd4 outputs 530, 532, through 534, for the appropriate 16-bit fields to be stored in the IRAM 503. Only Pd4 bits that hold valid information are generated in the predecoder 520. The instructions on output bus 518 are appropriately split, for example, as illustrated for a first 16-bits 536, a second 16-bits 538, through a final 16-bits 540, for storage into the IRAM 503. The instruction 16-bit fields 536, 538, through 540 and their respective Pd4 outputs 530, 532, through 534, are stored into an IRAM line, such as IRAM line 542 under control of write control logic 544. In order to save power, if the processor state at the time of the fetch signal 526 is the state restricting instructions to be only 32-bit instructions on word aligned boundaries, such as the exemplary first mode of operation, then the instructions to be stored in the IRAM line 542 are all 32-bit instructions. With only 32-bit instructions to be stored in the IRAM line 542, only half of the Pd4 bits need to be written, such as Pd4 output 530. The Pd4 outputs, such as Pd4 output 532, associated with the second half 16-bits of the 32-bit instruction are not required, and are not written in IRAM 503. In an L1 Icache line of 160-bits, there can be stored four 32-bit instructions and 32-bits of predecode information of which only 16-bits are required to be stored when the L1 Icache line has only 32-bit instructions, as is the case for the first mode of operation. On average, this represents a 10% savings in power when writing to the L1 Icache, due to not writing 16-bits out of the 160-bits of the L1 Icache line.

When instructions are written to the Icache, tag information is also written to the ICAM 502. In the ICAM unit 502, the fetch address 524 and processor state at the time of the fetch signal 526 are stored in an ICAM line, such as ICAM line 512. The ICAM line 512 is directly related to the IRAM line 542 so that on an L1 Icache hit 550 in the ICAM unit 502 the appropriate line in the IRAM unit 503 can be output on IRAM output 552 under control of read control logic 546. The IRAM output 552 contains the desired instruction and a number of following instructions which are sent to the instruction alignment (IDA) stage 516.

Instructions received in the instruction alignment stage 516 are aligned and made ready for a subsequent decode and execute stage 554. The instruction alignment stage 516 and decode stage 554 know the state of the cache line since, for example, the Pd4 bits track down the pipeline. Beginning from the pipeline stage for accessing instructions from the IRAM unit 503, the Pd4 bits proceed to the instructions alignment stage 516, and then to the decode stage 554. If the operating mode state of processor 210 in the IDA 516 is the first mode of operation for 32-bit only instructions, then the alignment logic knows that only the $1^{st}$, $3^{rd}$, $5^{th}$, and other odd predecode bit fields (Pd4) are valid. If the operating mode state of processor 210 in the IDA 516 is the second mode of operation for 16-bit and 32-bit instructions, then all Pd4 fields are considered since all Pd4 fields may be valid. A beginning Pd4 field is evaluated to determine whether the associated 16-bit field is the first half of a 32-bit instruction or a 16-bit instruction. If the Pd4 field indicates that its associated 16-bit field is the first half of a 32-bit instruction, then the next Pd4 field is ignored. If the Pd4 field indicates a 16-bit instruction, then the next consecutive Pd4 field is similarly examined. This processes continues, rippling across the remaining Pd4 fields in the fetched cache line.

As an example, on an L1 cache line hit, the IRAM output 552 may supply 64-bits of instructions, allowing up to four 16-bit instructions, two 16-bit instructions and a single 32-bit instruction, or up to two 32-bit instructions, and associated predecode bits, to the instruction alignment unit 516. Alternatively, the IRAM output 552 may supply the full IRAM cache line such as IRAM line 542. In order to save power, if the processor state 506 indicates the processor is in the mode which uses only 32-bit instructions on word aligned boundaries, then the instructions to be read from the IRAM line 542 are all considered 32-bit instructions. With only 32-bit instructions stored in the IRAM line, only half of the Pd4 bits need to be read, such as the Pd4 field 556. The Pd4 bits, such as Pd4 field 558, associated with the second half 16-bits of a 32-bit instruction are not required. In an L1 Icache line of 160-bits, four 32-bit instructions and 32-bits of predecode information can be stored. However, only 16-bits of predecode information are required to be read in this example. On average, this represents a 10% savings in power when reading from the L1 Icache, due to not reading 16-bits of the 160-bits when reading the L1 Icache line.

Two examples have been presented in FIGS. 3A-3C and FIGS. 4A-4C illustrating power savings that varied dependent upon the processor operating mode state. The processor fetch operating mode state (FOMS) 510, is stored in each tag, such as tag 512. The stored FOMS 510 may indicate a first state 580 representing the first mode of operation or a second state 582 representing the second mode of operation, for writing and reading the predecode bits. In the example of the L1 Icache line 350 of FIG. 3C, the whole L1 Icache line 350 is made up of 16-bit and 32-bit instructions, which when written to the IRAM 503 is associated with an ICAM tag having a FOMS that indicates the second state 582. In the example of the L1 Icache line 450 of FIG. 4C, the whole L1 Icache line 450 is made up of only 32-bit instructions, which when written to the IRAM 503 is associated with an ICAM tag having a FOMS that indicates the first state 580. In the second state 582, all Pd4 fields are enabled for both writing and reading. In the first state 580, only the Pd4 fields associated with the first half 16-bits of each 32-bit instruction are enabled and the Pd4 fields associated with the second half 16-bits of each 32-bit instruction are not enabled for writing or reading the IRAM 503 instructions.

Figure 6:
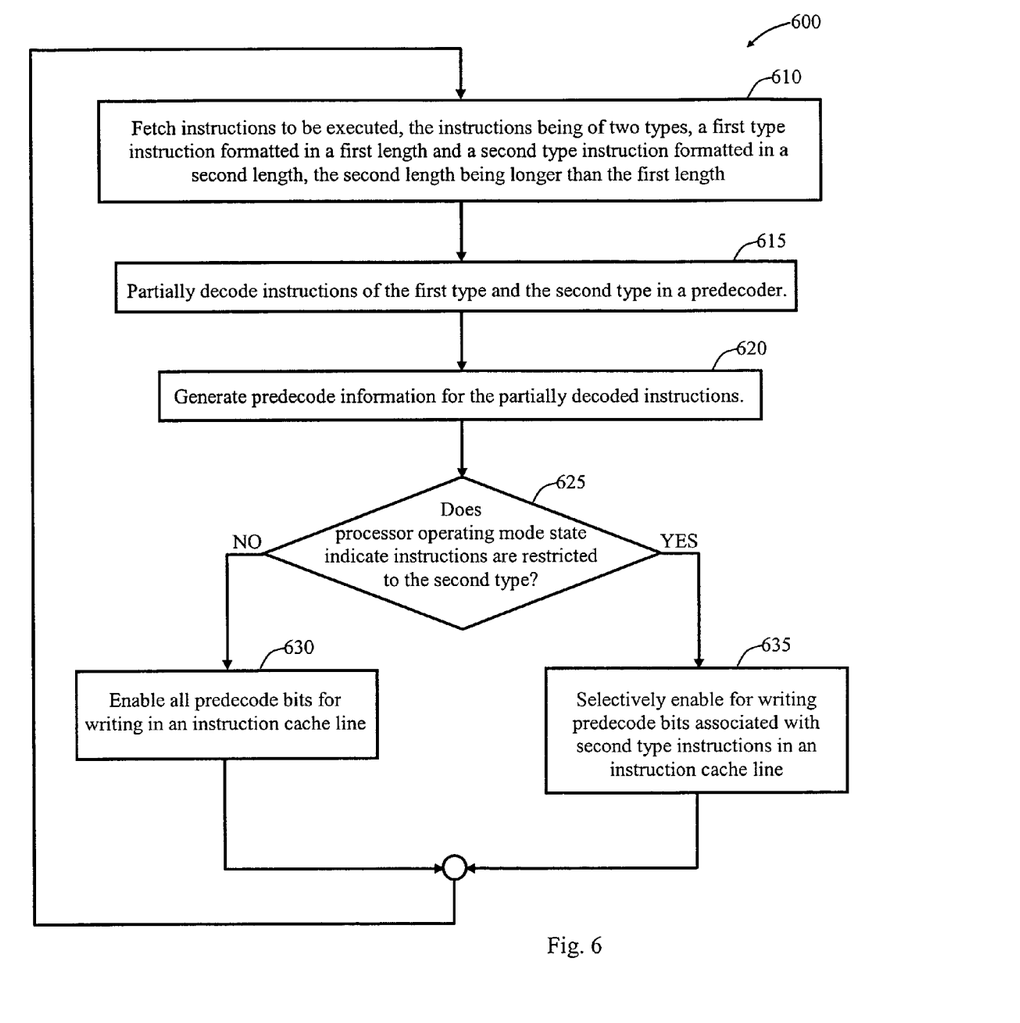
FIG. 6 is a flow chart of operational steps required to save power when writing and reading predecode information from an instruction cache line in accordance with the present invention.

FIG. 6 is a flow chart 600 illustrating operational steps in accordance with the present invention for saving power when writing and reading predecode information from an instruction cache line. In a first step 610, a processor fetches instructions to be executed where the instructions are of two types. A first type instruction is formatted in a first length, such as 16-bits, and a second type instruction is formatted in a second length. The second length, such as 32-bits, is longer than the first length. In the next step 615, the instructions of the first type and the second type are partially decoded in a predecoder. In step 620, predecode information is generated for the partially decoded instructions. In step 625, it is determined whether the processor operating mode state indicates instructions are restricted to the second type. If the processor operating mode state is such that the processor does not restrict instructions to the second type, step 630 is followed to enable all predecode bits in an instruction cache line for writing. If the processor operating mode state is such that the processor does restrict instructions to the second type, step 635 is followed to selectively enable predecode bits associated with second type instructions in an instruction cache line for writing. After writing a cache line for a fetched instruction, the system returns to step 610.

The present invention is not limited to the illustrated pipeline stages 500 and is further applicable to any pipeline processor having variable length instructions which stores predecode information in an instruction cache. Extensions to a variable length processor instruction set may be accommodated by the present invention if the extension supports a unique mode of instruction set use such that predecode information may be selectively controlled thereby saving write and read power. For example, a third mode may be specified where only 64-bit instructions are operative and all 64-bit instructions are located on double word boundaries, such that 64-bit instructions are not split across an L1 Icache line. The processor using 64-bit instruction types may be an extension of the exemplary processor 210 described above. The extended processor could have operating mode states encoded for the first state 580 restricted to only 32-bit instructions, the second state 582 for both 16-bit and 32-bit instructions, and a third state 584 restricted to only 64-bit instructions. A 64-bit instruction in an Icache line, such as IRAM line 542 of FIG. 5, would be partitioned into four 20-bit fields, where each 20-bit field has a section of the 64-bit instruction and an associated Pd4 field. With 64-bit instructions in an L1 Icache line, the Pd4 fields associated with the first 16-bits of the 64-bit instructions would be used for the whole 64-bit instruction, and the following three Pd4 fields would not be required. In the L1 Icache line, the first, fifth, ninth, and the like Pd4 fields would be used while the other, second, third, fourth, sixth, seventh, eighth, tenth and the like, Pd4 fields would not be written to or read from. With a 160-bit L1 Icache line containing two 64-bit instructions and thirty two Pd4 bits, twenty four bits of the thirty two Pd4 bits would not be written to or read from. On average, this represents a 15% power savings, when accessing an L1 Icache line due to not writing and not reading 24-bits out of the 160-bits in the L1 Icache line.

The present invention is also not limited to instruction lengths that are power of two. For example, consider an alternative architecture that has 16-bit and 24-bit instructions and a mode that restricts instructions to the 24-bit type. Both 16-bit and 24-bit instructions require four predecode bits. In this example, an instruction cache line is partitioned into 8-bit instruction sections and 2-bit predecode sections. A 16-bit instruction would consist of 20-bits organized as {8-bits, 2-bits Pd2, 8-bits, 2-bits Pd2}. A 24-bit instruction would consist of 30-bits organized as {8-bits, 2-bits Pd2, 8-bits, 2-bits Pd2, 8-bits, 2-bits Pd2}. A 160-bit cache line storing 16-bit instructions would be able to hold eight 16-bit instructions organized as eight 20-bit sections for a total of 160-bits with all bits fully utilized. A 160-bit cache line storing 24-bit instructions would be able to hold five 24-bit instructions organized as five 30-bit sections for a total of 150-bits, with five Pd2 2-bit fields that are not valid and 10-bits remaining in the line that are not utilized. By having the writing or reading of 24-bit instructions dependent upon the processor operating mode, only bits in the cache line containing valid information are accessed and 20-bits are not accessed, saving power as compared to writing and reading all bits in the line.

While the present invention has been disclosed in a presently preferred context, it will be recognized that the present teachings may be adapted to a variety of contexts consistent with this disclosure and the claims that follow.

We claim:

1. An apparatus for saving power in a processor environment which supports variable length instructions, the apparatus comprising:

a predecoder for partially decoding instructions of a first length and a second length, the second length being longer than the first length, and generating predecode bits for instructions of both the first length and the second length;

a processor operating mode state indicator, the processor operating mode state indicator indicating that the processor is operating in a mode that restricts instructions to instructions of the second length;

an instruction cache having a plurality of cache lines, a cache line configured to store a plurality of instructions and to store predecode bits at a plurality of predetermined bit fields; and write control logic to selectively write predecode bits in a cache line dependent upon the processor operating mode state indicator whereby less than all the plurality of predetermined predecode bit fields for an instruction are written for an instruction of the second length.

2. The apparatus of claim 1 wherein the first length of instructions are 16-bits and the number of predecode bits are four bits.

3. The apparatus of claim 1 wherein the first length of instructions are 8-bits and the number of predecode bits are two bits.

4. The apparatus of claim 1 wherein the plurality of cache lines are stored in a first memory and the instruction cache farther comprises:

a second memory for storing tags, each tag associated with a cache line, each tag holding an instruction address and a processor state bit, the processor state bit indicating the processor operating mode state at the time of the fetch.

5. The apparatus of claim 1 wherein the first length is 16-bits and the second length is 32-bits, and wherein each first length instruction has four predecode bits and each second length instruction has first and second groups of four predecode bits, and the second group of predecode bits for the second length instruction is not written.

6. The apparatus of claim 1 wherein the predecode bit field classifies instructions into functional and control categories of instructions.

7. The apparatus of claim 1 wherein the write control logic writes a second length instruction to multiple instruction sections of the cache line and writes one predecode section associated with one of the instruction sections being occupied by a portion of the second length instruction, the other predecode sections associated with instruction sections being occupied by other portions of the second length instruction being invalid and not written.

8. The apparatus of claim 1 wherein the processor operating mode state indicator farther indicates that the processor is operating in a mode that restricts instructions to instructions of a third length longer than the second length, and the predecoder further operates to decode instructions of the third length.

9. The apparatus of claim 1 wherein the instruction cache further comprises:

an instruction content addressable memory (ICAM) having a plurality of ICAM tags, an ICAM tag associated with each cache line, the ICAM tag allocated for storing an instruction address and a processor state bit, the processor state bit having a value of the processor operating mode state indicator at the time of the fetch; and write control logic for writing the instruction address and the processor state bit into the ICAM tag.

10. An apparatus for saving power when reading an instruction cache line, the apparatus comprising:

a processor performing fetch operations, the fetch operations fetching instructions of a first length and a second length, the second length being longer than the first length;

a processor operating mode state indicator, the processor operating mode state indicator indicating that the processor is operating in a mode that restricts instructions to instructions of the second length;

an instruction cache having a plurality of cache lines and tags associated with each cache line, a cache line configured to store a plurality of instructions and to store predecode bits at a plurality of predetermined bit fields, the tags having an instruction address portion and a processor operating mode state portion; and read control logic to read selected predecode bit fields in a cache line dependent upon a tag match hit whereby less than all of the plurality of selected predetermined bit fields available for an instruction are read for an instruction of the second length.

11. The apparatus of claim 10 further comprising:

a hit comparator for determining the tag match hit, the hit comparator comparing a processor fetch instruction address and the processor operating mode state indicator with the tag, and when the comparison is equal generating the tag match hit.

12. The apparatus of claim 10 wherein the selected predecode bit fields classify instructions such that instructions read from the cache line can be aligned and decoded.

13. The apparatus of claim 10 wherein the processor fetch operations include supplying an instruction address and the processor operating mode state indicator.

14. The apparatus of claim 10 wherein the instruction cache comprises:

an instruction content addressable memory (ICAM) having a plurality of ICAM tags, an ICAM tag associated with each cache line, the ICAM tag having an instruction address portion and a processor operating mode state indicator portion; and a tag comparator associated with each tag.

15. A method comprising:

fetching instructions of a first length or a second length, the second length being longer than the first length;

predecoding instructions of the first length and the second length in a predecoder;

generating predecode bits for instructions of both the first length and the second length; and writing selected predecode bits in an instruction cache line dependent upon an operating mode that restricts instructions to instructions of the second length, the instruction cache line being configured to store a plurality of instructions and to store predecode bits at a plurality of predetermined predecode bit fields, whereby less than all the plurality of predetermined predecode bit fields for an instruction are written for an instruction of the second length.

16. The method of claim 15 wherein in the step of writing selected predecode bits in an instruction cache line further comprises:

writing one of a number of predecode bit fields available for use by an instruction of the second length whereby less than all the predecode bit fields are written for instructions of the second length.

17. The method of claim 15 further comprising:

writing an instruction address and a processor state bit in a tag associated with the cache line, the processor state bit indicating the processor operating mode state at the time of the fetch.

18. The method of claim 17 further comprising:

comparing a processor fetch instruction address and a processor operating mode indicator with the tag associated with the instruction cache line;

generating a tag match hit if the comparison is equal; and reading selected predecode bits in an instruction cache line dependent upon a tag match hit whereby less than all of the predecode bits available in the cache line are read for instructions of the second length.

* * * * *